US012145290B2

(12) United States Patent
Benedetti

(10) Patent No.: US 12,145,290 B2
(45) Date of Patent: Nov. 19, 2024

(54) PROCESS AND SYSTEM FOR THE PRODUCTION OF PANELS MADE OF WOODEN MATERIAL

(71) Applicant: IMAL S.R.L., Modena (IT)

(72) Inventor: Paolo Benedetti, Modena (IT)

(73) Assignee: IMAL S.R.L., Modena (IT)

( * ) Notice: Subject to any disclaimer, the term of this patent is extended or adjusted under 35 U.S.C. 154(b) by 269 days.

(21) Appl. No.: 17/771,975

(22) PCT Filed: Oct. 29, 2020

(86) PCT No.: PCT/IB2020/060135

§ 371 (c)(1),
(2) Date: Apr. 26, 2022

(87) PCT Pub. No.: WO2021/084455

PCT Pub. Date: May 6, 2021

(65) Prior Publication Data

US 2022/0371220 A1 Nov. 24, 2022

(30) Foreign Application Priority Data

Oct. 30, 2019 (IT) ........................ 102019000019799

(51) Int. Cl.

| | |
|---|---|
| ***B27N 3/18*** | (2006.01) |
| ***B27N 3/02*** | (2006.01) |
| ***B27N 3/14*** | (2006.01) |
| ***B27N 7/00*** | (2006.01) |

(52) U.S. Cl.

CPC ................ *B27N 3/18* (2013.01); *B27N 3/02* (2013.01); *B27N 3/14* (2013.01); *B27N 7/005* (2013.01)

(58) Field of Classification Search

CPC ... B27N 3/18; B27N 3/02; B27N 3/14; B27N 7/005; D04H 1/00

See application file for complete search history.

(56) References Cited

U.S. PATENT DOCUMENTS 3,790,417 A * 2/1974 Paterson .................. B27N 3/00 156/62.8
4,521,477 A * 6/1985 Kiss ......................... B27N 3/14 156/62.8

(Continued)

FOREIGN PATENT DOCUMENTS

CN 1143764 C * 3/2004 ............... B27N 3/14
DE 10101952 A1 * 7/2002 ............... B27N 3/24

(Continued)

*Primary Examiner* — Jose A Fortuna

(74) *Attorney, Agent, or Firm* — ASLAN LAW, P.C.

(57) ABSTRACT

A process for the production of panels made of wooden material comprises at least the following phases: supply of a plurality of types of wooden material in the form of flakes and/or dust; forming of at least one support layer in at least one of the types of wooden material on a work surface; forming of at least one final layer on top of the support layer, in another of the types of wooden material other than that of the support layer itself, so as to form a mattress; compacting of the mattress to form a compacted panel made of wooden material, wherein the process comprises, after the formation of the at least one support layer and before the formation of the at least one final layer, at least one steam heating phase and one pressing phase of the at least one support layer to obtain a pre-compacted mattress.

10 Claims, 3 Drawing Sheets

(56) References Cited

U.S. PATENT DOCUMENTS

| | | | | | |
|---|---|---|---|---|---|
| 5,718,786 | A * | 2/1998 | Lindquist | B32B 5/12 | 428/218 |
| 6,176,951 | B1 * | 1/2001 | Bielfeldt | B27N 3/28 | 264/460 |
| 6,533,889 | B2 * | 3/2003 | Dueholm | B27N 3/24 | 264/109 |
| 6,833,183 | B2 * | 12/2004 | Klasterka | B27N 3/14 | 428/221 |
| 9,522,480 | B2 * | 12/2016 | Neubauer | B32B 5/20 | |
| 10,391,669 | B2 * | 8/2019 | Weinkötz | B27N 3/005 | |
| 10,661,472 | B2 * | 5/2020 | Weinkötz | B27N 3/18 | |
| 11,890,847 | B2 * | 2/2024 | Ziegler | B27N 7/005 | |
| 2001/0017428 | A1 * | 8/2001 | Klasterka | B27N 3/14 | 264/109 |
| 2012/0094093 | A1 * | 4/2012 | Nilsson | B27N 3/14 | 156/583.1 |
| 2022/0371220 | A1 * | 11/2022 | Benedetti | B27N 7/005 | |

FOREIGN PATENT DOCUMENTS

| | | | | |
|---|---|---|---|---|
| DE | 102016116010 B4 | * | 2/2019 | B08B 1/008 |
| EP | 1011940 B1 | * | 11/2001 | B27N 3/00 |
| EP | 1 140 447 B1 | | 3/2003 | |
| EP | 1 608 494 B1 | | 3/2011 | |
| EP | 2 588 286 A1 | | 5/2013 | |
| EP | 2574455 B1 | * | 8/2017 | B27N 7/005 |
| FR | 2469498 A1 | * | 5/1985 | B32B 5/02 |
| RU | 2208515 C2 | * | 7/2003 | B27N 3/14 |
| WO | WO-0035644 A1 | * | 6/2000 | B27N 3/14 |
| WO | WO-2005046950 A1 | * | 5/2005 | B27N 3/02 |
| WO | WO 2012/000901 A1 | | 1/2012 | |
| WO | WO-2017207450 A1 | * | 12/2017 | B27N 3/14 |
| WO | WO-2017207451 A1 | * | 12/2017 | |
| WO | WO-2020239390 A1 | * | 12/2020 | B27N 1/00 |
| WO | WO-2021084455 A1 | * | 5/2021 | B27N 3/02 |
| WO | WO-2022258438 A1 | * | 12/2022 | |

* cited by examiner

PROCESS AND SYSTEM FOR THE PRODUCTION OF PANELS MADE OF WOODEN MATERIAL

CROSS-REFERENCE TO RELATED APPLICATIONS

This application claims priority to IT Patent Application No. 102019000019799 filed on Oct. 30, 2019, and this application claims priority to and is a 371 of international PCT Application No. PCT/IB2020/060135 filed on Oct. 29, 2020, the entire contents of which are hereby incorporated by reference.

TECHNICAL FIELD

The present invention relates to a process and a system for the production of panels made of wooden material, particularly of dust and flakes of wood.

BACKGROUND ART

It is well known that to produce this type of panels it is necessary to treat the raw material, i.e. wood, in special production plants where all the phases and treatments necessary to transform the raw material into panels take place.

The most important macrophases of known processes are briefly described below.

In a first macrophase, elongated wood flakes are obtained by means of chipping treatments.

In a second macrophase the wood flakes are first dried, generally in special drum or belt dryers, then the flakes are selected and mixed with resins and glues.

In a third macrophase the formation of the panel takes place.

In particular, the flow of wooden material is conveyed to special forming machines, which also operate a sort of selection of the incoming wooden material, separating it into two flows of flakes substantially homogeneous in size (medium flakes and long flakes).

The selection is carried out by means of rotating dispensing elements, so that the selected flakes fall on a work surface, of the type of a conveyor belt, placed below the dispensing elements themselves, arranging in different layers according to their dimensions.

This way, a plurality of layers of flakes, superimposed on each other, are formed on the conveyor belt to make a multi-layer mattress made of wooden material.

The mattress is then conveyed to thermal presses that heat and compact the wood material, thus activating the glues and resins previously applied to the flakes and giving the final thickness to the panel.

This process allows obtaining panels consisting of at least three layers of wooden material in flakes, where the flakes that make up the external layers are of a different type than the flakes of the internal layer.

In a first type of panels, called Oriented Strand Board (OSB), a central layer of medium-sized flakes is positioned between two layers of long flakes.

In a further type of panels, called Light Strand Board (LSB), instead, there is a central layer of long flakes positioned between two layers of medium-sized flakes.

The processes of known type for the production of such panels do have some drawbacks.

During deposition, in fact, the flakes fall by gravity onto the work surface underneath and are arranged in a disorderly manner, parallel and transversely to the work surface itself.

Then, during the compacting phase, the flakes are compressed and brought closer together, thanks to the resins and/or glues, according to the same arrangement with which they were deposited on the work surface.

This causes the surface of the finished panel to be considerably irregular and uneven and, in other words, to have porosity that undermines its aesthetics as well as its functionality.

It follows that the panels obtained this manner are mainly used for structural applications in the shipbuilding sector and are not suitable for applications in which the aesthetic appearance is of substantial importance.

Moreover, these panels are not even suitable to be “ennobled”, i.e. to be treated with waterproofing substances and/or coated with wooden dusts, paints, paper or other material in order to give the panels themselves a better aesthetic appearance that would make them suitable for a wider range of applications.

The presence of empty spaces on the external layers would, in fact, make the surface finish imprecise and of poor quality.

Moreover, in order to carry out an ennobling finishing on this type of panels, large quantities of material would have to be applied, from which would result a considerable increase both in production costs, as this material has a not negligible cost, and in the unit weight of the panel.

Another drawback, related to the large amount of material used in the external coating, concerns the environmental impact that each panel would have both in the production phase, because fine dusts and paints are impacting substances, and in the transport phase, because a higher weight of the panel corresponds to higher emissions related to fuel consumption.

DESCRIPTION OF THE INVENTION

The main aim of the present invention is to devise a process and a system for the production of panels made of wooden material that allow obtaining panels where the irregularity of the external layers is considerably reduced.

Another object of the present invention is to devise a process and a system for the production of panels made of wooden material that allow obtaining panels with better aesthetic properties than the panels of known type.

A further object of the present invention is to devise a process and a system for the production of panels made of wooden material that allow extending the range of industrial application of the panels thus obtained.

Another object of the present invention is to devise a process and a system for the production of panels made of wooden material that allow overcoming the aforementioned drawbacks of the prior art within a simple, rational, easy, effective to use as well as low cost solution.

The above mentioned objects are achieved by the present process for the production of panels made of wooden material having the characteristics according to at least one embodiment.

The above mentioned objects are achieved by the present system for the production of panels made of wooden material having the characteristics of according to at least one embodiment.

BRIEF DESCRIPTION OF THE DRAWINGS

Other characteristics and advantages of the present invention will be more evident from the description of a preferred, but not exclusive, embodiment of a process and a system for the production of panels made of wooden material, illustrated by way of an indicative, yet non-limiting example, in the attached tables of drawings in which.

EMBODIMENTS OF THE INVENTION

Figure 1:
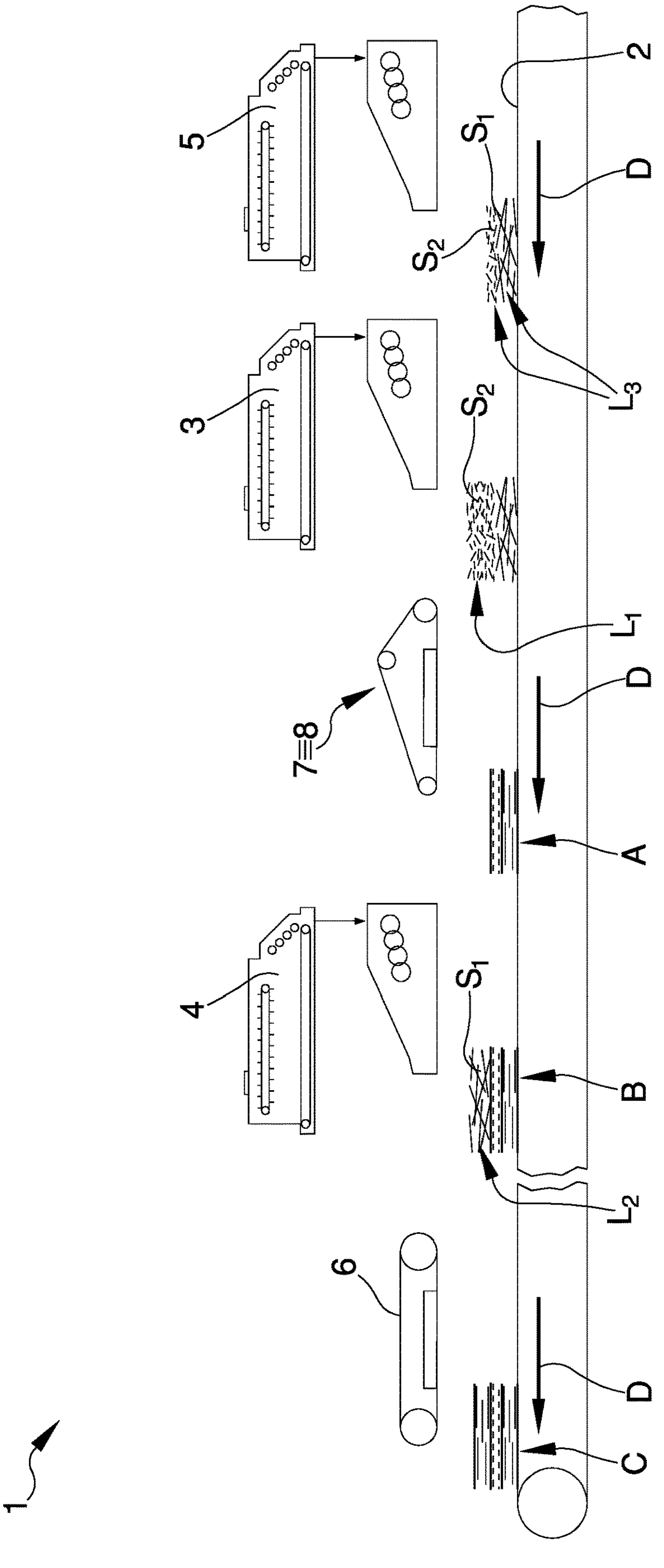
FIG. 1 is a schematic representation of a first embodiment of the system for the production of panels made of wooden material according to the invention.

With particular reference to these figures, reference numeral 1 globally indicates a system for the production of panels made of wooden material.

The system 1 is intended to form a plurality of layers L1,L2,L3 in a plurality of types of wooden material S1,S2,P in order to obtain at least one panel C made of wooden material.

In the context of the present discussion, the expression "wooden material" means a set of wood fragments, of different sizes, obtained through an operation of chipping of the wood itself and, then, these fragments are dried in special dryers.

The fragments can be in the form of flakes S1,S2 or dust P.

In particular, the flakes S1,S2 are fragments of elongated shape that are appropriately selected according to their size.

The dust P, on the other hand, is a fine wooden material, mainly used to form the external layers. For this purpose, the dust P can be pre-treated, e.g., with waterproofing agents and/or mixed with colouring agents and/or with decorative elements.

The flakes S1,S2 and the dust P are mixed with resins and/or glues which act as binders and contribute to the production of the panel.

The above mentioned selection and mixing phases are generally carried out by forming machines adapted to make a dimensional selection of the wooden material and to dispense it through rotating dispensing elements.

The plurality of the types of wooden material S1,S2,P comprises at least two of either a first type of flake S1, a second type of flake S2, or dust P.

The types of flakes S1,S2 are preferably selected between medium-sized and long flakes.

The system 1 comprises:

- at least one work surface 2 movable along one direction of forward movement D;
- deposition means 3 of one type of wooden material S1,S2 on the work surface 2 so as to form at least one support layer L1;
- dispensing means 4 of at least another type of wooden material S1,S2,P other than that of the support layer L1, so as to form at least one final layer L2 on top of the support layer itself to define a mattress B.

In more detail, the final layer L2 represents one of the external layers of the panel C.

Appropriately, the type of wooden material S1,S2 deposited by the deposition means 3 is selected between the first and the second type of flakes S1 and S2 and the type of wooden material S1,S2,P deposited by the dispensing means 4 is selected between the first type of flakes S1, the second type of flakes S2 and the dust P.

The work surface 2 can be of the type of a conveyor belt or the like.

The movement of the work surface 2 along the direction of forward movement D allows the consequential deposition of the types of wooden material S1,S2,P to form the layers L1,L2 in succession on each other.

The system 1 also comprises forming means 5 of at least one base layer L3 adapted to deposit at least one type of wooden material S1,S2,P on the work surface 2, below the support layer L1.

The forming means 5 are, therefore, arranged upstream of the deposition means 3.

Advantageously, the forming means 5 are adapted to form a plurality of base layers L3, each comprising a type of wooden material S1,S2,P other than that of at least one of the adjacent base layers L3.

Advantageously, the system 1 can comprise forming means 5 adapted to deliver a plurality of different types of wooden material S1,S2,P.

Alternatively or in combination thereof, the system 1 can comprise a plurality of forming means 5 each adapted to deliver a single type of wooden material S1,S2,P.

The base layers L3 are formed in succession one on top of the other according to the characteristics that the panel C is given.

The mattress B thus formed is made, therefore, in three or more layers L1,L2,L3 formed by a plurality of types of wooden material S1,S2,P.

In a first embodiment, shown in FIG. 1, the mattress B is made of the two types of flakes S1,S2.

In particular, the final layer L2 is formed of a first type of flakes S1, the support layer L1 is formed of a second type of flakes S2 and the base layers L3 are formed of the first and of the second type of flakes S1 and S2.

Figure 3:
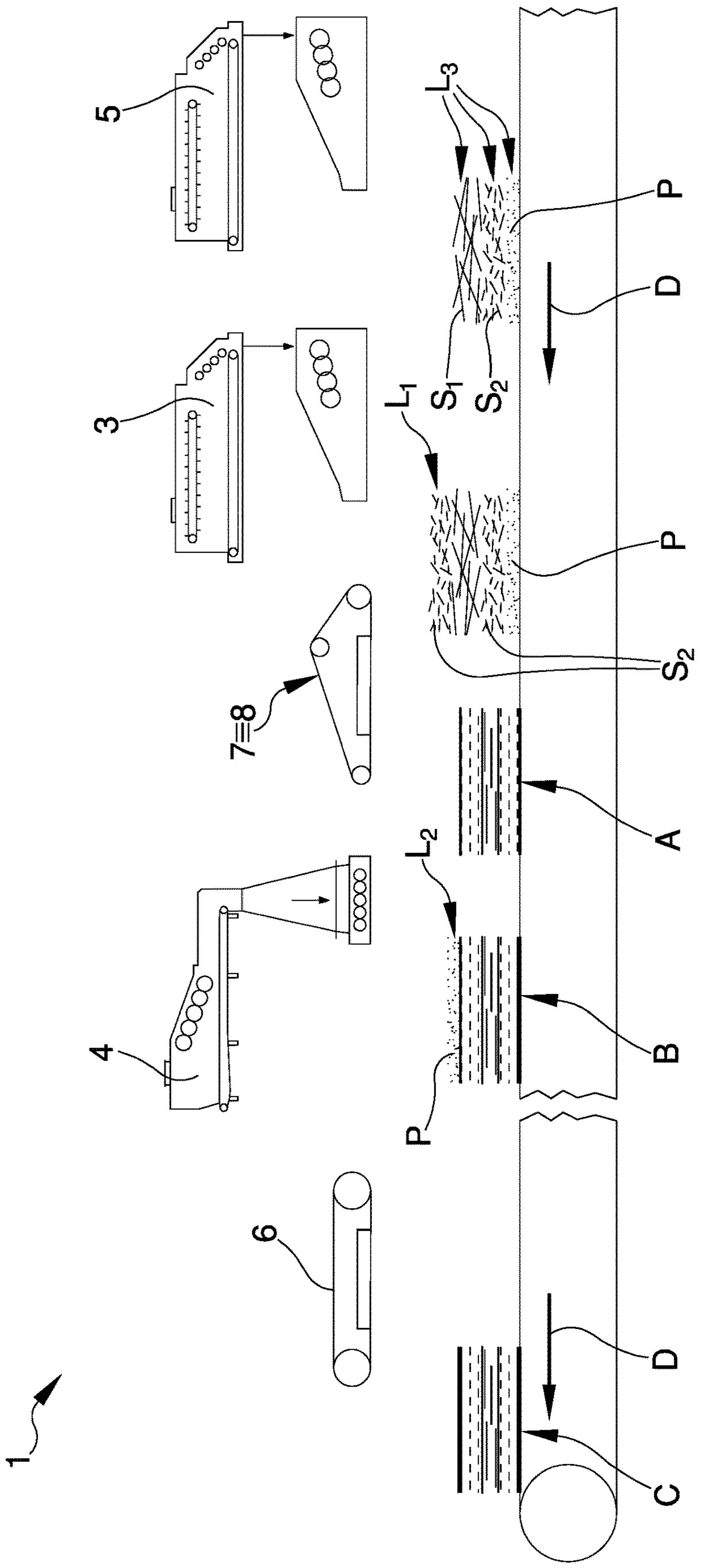
FIG. 3 is a schematic representation of a second embodiment of the system according to the invention.

In FIG. 3, instead, a second embodiment of the system 1 is shown, wherein the mattress B is made of flakes S1,S2 and dust P.

In particular, the final layer L2 is formed of the dust P, the support layer L1 is formed of the flakes S1,S2 and the base layers L3 are formed of the flakes S1,S2 and dust P.

The system 1 also comprises compaction means 6 of the mattress B to form a compacted panel C made of wooden material.

The compaction means 6 are, therefore, arranged downstream of the dispensing means 4.

The compaction means 6 will be described in more detail later in this discussion.

According to the invention, the system 1 comprises steam heating means 7 and pressing means 8 of the at least one support layer L1 to define a pre-compacted mattress A, positioned between the deposition means 3 and the dispensing means 4.

The steam heating means 7 and the pressing means 8 are adapted to at least partly compact the support layer L1 to even out the arrangement of the flakes S1,S2.

This way a sort of "ironing" of the flakes S1,S2 is carried out, which allows reducing the roughness and irregularities of the surface of the support layer L1.

In particular, steam heating and pressing are carried out in such a way as to orient the flakes S1,S2 substantially parallel to the work surface 2 and thus reduce the presence of recesses and protrusions on the surface of the pre-compacted mattress A.

The steam heating means 7 are adapted to dispense steam F on the at least one support layer L1.

In particular, the steam F allows stretching and softening the fibers of the flakes S1,S2 and, in addition, allows the thermal activation of the resins and/or glues. For this purpose, the steam heating means 7 comprise diffusion means 7*a* of steam F.

Preferably, the steam F comprises dry saturated steam.

More preferably, the steam F is made up of dry saturated steam.

This allows the transmission of heat to the fibers without compromising the moisture content of the layers L1,L3.

A high level of moisture, in fact, can lead to a series of problems such as, e.g., aesthetic defects on the surface of the finished panel C, inadequate activation of the resins and/or glues, and even a reduction in the stiffness and mechanical resistance of the panel itself.

The pressing means 8 are adapted to crush at least the support layer L1 to even out the arrangement of the flakes S1,S2 and make them adhere to each other.

The steam heating means 7 and the pressing means 8 are conveniently positioned on board of a same machine.

This way, the pressing phase is optimized, which is carried out while the flakes S1,S2 are still warm and softened, and therefore more easily deformed.

By doing this, the action of the resins and/or glues mixed with the flakes S1,S2 is also optimized, which carry out their function more effectively when hot.

The pre-compacted mattress A that is obtained is therefore provided with a smoother and more even surface on which the deposition of the final layer L2 is then carried out to obtain the mattress B.

This way, the flakes S1,S2 or dust P are deposited on the underlying layers in a more orderly manner.

In particular, the dust P has the function of further smoothing the surfaces of the panel C after steam heating and pressing.

In a further embodiment, not shown in detail in the figures, the system 1 can also comprise pre-compaction means arranged upstream of the compaction means 6 and provided with means for the distribution of steam F on the mattress B and pre-compression means of the layers L1,L2, L3.

The pre-compaction means have the function of making even the arrangement of the flakes S1,S2 of the final layer L2, through the distribution of steam F, so as to facilitate the subsequent action of the compaction means 6.

Conveniently, the steam F consists of dry saturated steam.

The steam distribution means and the pre-compression means are similar to the steam heating means 7 and to the pressing means 8 described above, respectively.

Similarly to the above, the steam distribution means stretch the fibers of the flakes S1,S2, by softening them, and activate the resins and/or glues of the wooden material S1,S2,P.

As mentioned above, the system 1 comprises compaction means 6 of the mattress B to form the panel C.

The compaction means 6, e.g. of the type of thermal presses, are adapted to heat and compact the wooden material S1,S2,P to form the final panel C.

In particular, the pressure and temperature applied by the compaction means 6 on the layers L1,L2,L3 is of greater intensity than that of the above mentioned pre-compaction means.

The operation of the system 1 in the execution of the process according to the invention is as follows.

The process which the present invention relates to comprises first of all a phase of supply of a plurality of types of wooden material S1,S2,P in the form of flakes and/or dust.

As previously reported, the plurality of types of wooden material S1,S2,P comprises at least one of either a first type of flake S1, a second type of flake S2, or dust P.

The phase of supply may comprise a chipping treatment of wooden material to obtain the flakes S1,S2 and dust P, which are then dried and treated with resins and/or glues.

The flakes S1,S2 are also selected according to the size of the flakes themselves. Preferably, the flakes S1,S2 are selected between medium-sized and long flakes.

The process comprises the forming of at least one support layer L1 in at least one of the types of wooden material S1,S2 on a work surface 2.

In particular, the support layer L1 is made of one of the types of flakes S1,S2.

The support layer L1 is formed by means of the deposition means 3.

The work surface 2, moving along the direction of forward movement D, transports the wooden material S1,S2,P towards the dispensing means 4 where the forming of at least one final layer L2 on top of the support layer L1 takes place, in another of the types of wooden material S1,S2,P other than that of the support layer itself, so as to form a mattress B.

In particular, the final layer L2 is made of one of the types of wooden material S1,S2,P selected from the first type of flakes S1, the second type of flakes S2 and the dust P.

According to the invention, the process comprises, after the formation of the support layer L1 and before the formation of the final layer L2, a steam heating phase and a pressing phase of the at least one support layer L1 to obtain the pre-compacted mattress A.

Steam heating is conveniently carried out by the dispensing of steam F on the support layer L1.

Steam F is dispensed by means of the diffusion means 7*a*.

The pressing phase is carried out in such a way that at least the support layer L1 is crushed.

Figure 2:
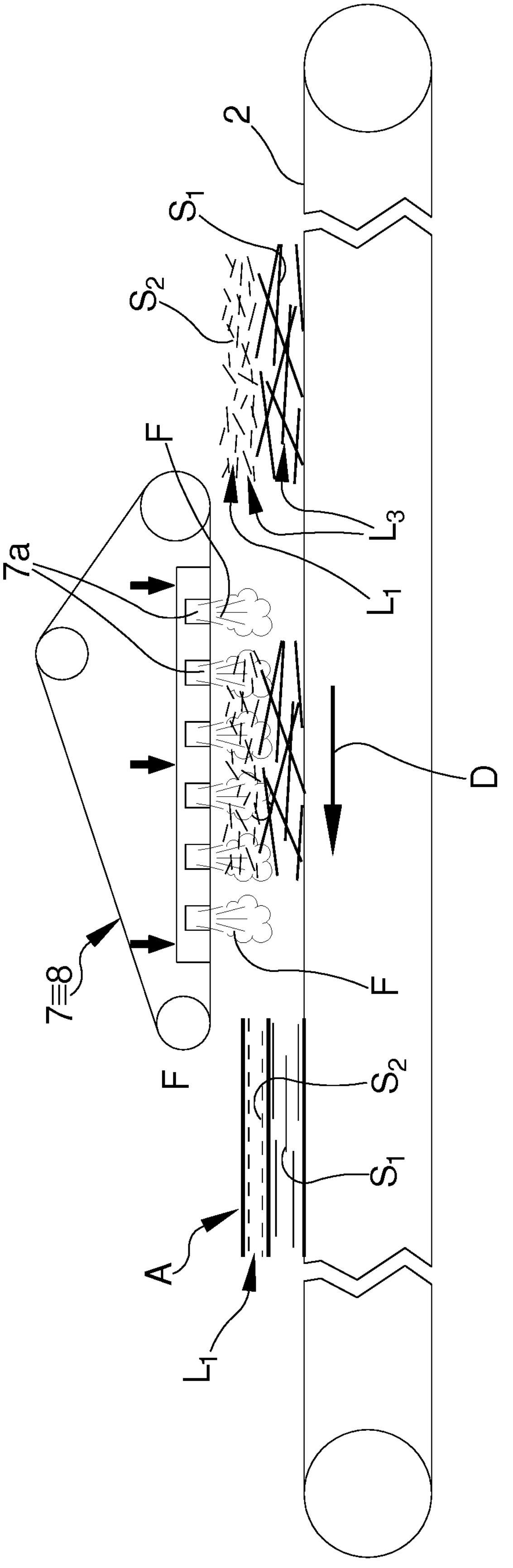
FIG. 2 is a schematic representation of a phase of the process for the production of panels according to the invention.

As shown in FIG. 2, steam heating and pressing are advantageously carried out substantially at the same time.

Before the forming of the at least one support layer L1, the process comprises the forming of at least one base layer L3 made of at least one type of wooden material S1,S2,P on the work surface 2, below the support layer X.

The support layer L1 is then formed on top of the at least one base layer L3.

The base layer L3 is made of one of the types of wooden material S1,S2,P selected from the first type of flakes S1, the second type of flakes S2 and the dust P.

The process advantageously comprises the forming of a plurality of the base layers L3, each of which is made of a type of wooden material S1,S2,P other than that of at least one of the adjacent base layers L3.

The forming of at least one base layer L3 is conveniently carried out by the forming means 5.

The mattress B, formed this way, is then transported along the direction of forward movement D towards the compaction means 6 where the compaction of the mattress B is carried out to form the compacted panel C made of wooden material.

In a further embodiment, not shown in the figures, the process may also comprise a pre-compacting phase of the mattress B carried out prior to the compacting.

The pre-compacting phase is carried out by the dispensing of steam F and pre-compression of the mattress B.

Appropriately, the pre-compacting phase is similar to the steam heating and pressing phases described above and is carried out by means of the pre-compaction means.

It has in practice been ascertained that the described invention achieves the intended objects and in particular the fact is underlined that the process and the system for the production of panels made of wooden material allow obtaining panels in which the irregularity of the external layers is considerably reduced.

This allows an easy ennobled finishing of the panels obtained and, therefore, extending the range of industrial application of the panels themselves.

Moreover, the process and the system for the production of panels made of wooden material allow obtaining panels provided with better aesthetic properties compared to the panels of known type.

The invention claimed is:

1. A process for the production of panels made of wooden material comprising at least the following phases:
- supply of a plurality of types of wooden material in a form of flakes and/or dust mixed with resins and/or glues which act as binders and contribute to the production of the panels;
- forming of at least one support layer in at least one of said types of wooden material on a work surface;
- forming of at least one final layer on top of said support layer, in another of said types of wooden material other than that of the support layer itself, so as to form a mattress;
- compacting of said mattress to form a compacted panel made of wooden material,
- wherein, after said formation of said at least one support layer and before said formation of said at least one final layer, at least one steam heating phase and one pressing phase of said at least one support layer is preformed and/or processed to obtain a pre-compacted mattress,
- wherein, before said forming of said at least one support layer, a forming phase of a base layer comprising a plurality of layers, each of which is made of one of said types of wooden material other than that of at least one of the adjacent base layer, and
- wherein said steam heating and said pressing are carried out substantially at the same time, where said steam heating is carried out by means of dispensing of steam on said at least one support layer, in this way a sort of "ironing" of the flakes is carried out, which allows reducing the roughness and irregularities of the surface of said support layer.

2. The process according to claim 1, wherein said steam consists of dry saturated steam.

3. The process according to claim 1, wherein said plurality of types of wooden material comprises at least two of either a first type of flakes, a second type of flakes or dust.

4. The process according to claim 1, wherein prior to said compacting, a pre-compacting phase of said mattress by means of dispensing of steam and pre-compressing of said mattress.

5. The process according to claim 1, wherein an action of the resins and/or the glues mixed with the flakes being optimized, which carry out their function more effectively when hot.

6. A system for the production of panels made of wooden material comprising:
- at least one work surface movable along one direction of forward movement;
- deposition means of at least one type of wooden material in a form of flakes and/or dust on said work surface mixed with resins and/or glues which act as binders and contribute to the production of the panels so as to form at least one support layer;
- dispensing means of at least another type of wooden material other than that of the support layer itself, so as to form at least one final layer on top of said support layer to define a mattress; and
- compaction means of said mattress to form a compacted panel made of wooden material, wherein
- steam heating means and pressing means of said at least one support layer to define a pre-compacted mattress, positioned between said deposition means and said dispensing means,
- wherein the system comprises forming means adapted to form a base layer comprising a plurality of layers, in which each of them comprises a type of wooden material other than that of at least one of the adjacent layer, and
- wherein said steam heating means and said pressing means are positioned on board of the same machine, in this way a sort of "ironing" of the flakes is carried out, which allows reducing the roughness and irregularities of the surface of said support layer.

7. The system according to claim 6, wherein said steam heating means comprise diffusion means of steam.

8. The system according to claim 7, further comprising pre-compaction means, arranged upstream of said compaction means, and comprising means for the distribution of steam on said mattress and pre-compression means of said layers.

9. The system according to claim 6, further comprising pre-compaction means, arranged upstream of said compaction means, and comprising means for the distribution of steam on said mattress and pre-compression means of said layers.

10. The system according to claim 6, wherein an action of the resins and/or the glues mixed with the flakes being optimized, which carry out their function more effectively when hot.

* * * * *